(12) United States Patent
Chien

(10) Patent No.: US 11,386,190 B2
(45) Date of Patent: *Jul. 12, 2022

(54) EVENT CHARACTERISTIC ANALYSIS FOR EVENT INPUT DISCRIMINATION

(71) Applicant: AT&T Mobility II LLC, Atlanta, GA (US)

(72) Inventor: Ginger Li Chien, Bellevue, WA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 225 days.

This patent is subject to a terminal disclaimer.

(21) Appl. No.: 16/455,515

(22) Filed: Jun. 27, 2019

(65) Prior Publication Data
US 2019/0325122 A1    Oct. 24, 2019

Related U.S. Application Data

(63) Continuation of application No. 15/048,775, filed on Feb. 19, 2016, now Pat. No. 10,372,889.

(51) Int. Cl.
*G06F 21/32* (2013.01)
*G06F 21/62* (2013.01)
(Continued)

(52) U.S. Cl.
CPC .......... *G06F 21/32* (2013.01); *G06F 21/6218* (2013.01); *H04L 9/32* (2013.01); *G06F 21/64* (2013.01)

(58) Field of Classification Search
CPC ...... G06F 21/32; G06F 21/6218; G06F 21/64; H04L 9/32
See application file for complete search history.

(56) References Cited

U.S. PATENT DOCUMENTS

| 7,158,776 B1 * | 1/2007 | Estes ...................... H04L 63/02 380/247 |
| 7,536,304 B2 * | 5/2009 | Di Mambro ............. G07C 9/37 704/273 |

(Continued)

FOREIGN PATENT DOCUMENTS

CN          102752453 A      10/2012

OTHER PUBLICATIONS

Final Office Action dated Feb. 28, 2018 for U.S. Appl. No. 15/048,775, 21 pages.

(Continued)

*Primary Examiner* — Robert B Leung
(74) *Attorney, Agent, or Firm* — Amin, Turocy & Watson, LLP

(57) ABSTRACT

Determining a level of congruence between modality-event characteristics is disclosed. Information can be collected from an event input source via one or more information collection modalities. Modality-event characteristics can be determined from this information. A level of congruence between the modality-event characteristics can be determined to enable initiating a response based on the level of congruence. The level of congruence can be based on satisfying a rule related to congruence between modality-event characteristics, user profile information, etc. The level of congruence can be related to a probability that the several inputs collected for an event, collected by a plurality of modalities, embody characteristics that are associated with the event occurring according to determined notions embodied in the rule and profile. Determining the level of congruence can support assertions that each input, across differing modes of capturing said input, accords with the expected inputs for an event.

20 Claims, 10 Drawing Sheets

(51) Int. Cl.
*H04L 9/32* (2006.01)
*G06F 21/64* (2013.01)

(56) References Cited

U.S. PATENT DOCUMENTS

| | | | | | |
|---|---|---|---|---|---|
| 7,545,917 | B2* | 6/2009 | Jones | | H04M 3/493 |
| | | | | | 379/210.01 |
| 7,698,566 | B1* | 4/2010 | Stone | | H04L 63/08 |
| | | | | | 713/186 |
| 7,702,086 | B2* | 4/2010 | Susen | | H04M 3/382 |
| | | | | | 379/93.02 |
| 9,031,846 | B2* | 5/2015 | Smith | | H04W 12/06 |
| | | | | | 704/270 |
| 9,257,133 | B1* | 2/2016 | Strand | | G06N 20/00 |
| 9,430,626 | B1* | 8/2016 | Rome | | G06F 21/32 |
| 2007/0005988 | A1* | 1/2007 | Zhang | | H04L 63/08 |
| | | | | | 713/186 |
| 2012/0290526 | A1* | 11/2012 | Gupta | | G06K 9/6293 |
| | | | | | 706/52 |
| 2013/0239206 | A1* | 9/2013 | Draluk | | H04L 63/083 |
| | | | | | 726/19 |
| 2014/0044318 | A1* | 2/2014 | Derakhshani | | G06K 9/00906 |
| | | | | | 382/117 |
| 2014/0143149 | A1* | 5/2014 | Aissi | | G06F 21/629 |
| | | | | | 705/44 |
| 2014/0337930 | A1* | 11/2014 | Hoyos | | G06F 21/34 |
| | | | | | 726/4 |
| 2014/0337948 | A1* | 11/2014 | Hoyos | | H04L 63/0861 |
| | | | | | 726/7 |
| 2015/0264572 | A1* | 9/2015 | Turgeman | | G06F 3/0485 |
| | | | | | 455/411 |
| 2015/0301796 | A1* | 10/2015 | Visser | | G10L 15/22 |
| | | | | | 715/728 |
| 2016/0135046 | A1* | 5/2016 | John Archibald | | H04W 12/082 |
| | | | | | 455/411 |
| 2016/0171198 | A1* | 6/2016 | John Archibald | | G06F 21/577 |
| | | | | | 726/19 |
| 2016/0352713 | A1* | 12/2016 | Grissen | | G06Q 50/265 |
| 2016/0378964 | A1* | 12/2016 | Singh | | G06F 21/32 |
| | | | | | 340/5.52 |

OTHER PUBLICATIONS

Office Action dated Sep. 1, 2017 for U.S. Appl. No. 15/048,775, 52 pages.

Aronowitz et al., "Multi-modal biometrics for mobile authentication," 2014 IEEE International Joint Conference on Biometrics (pp. 1-8), Oct. 2014.

Gupta et al., "Combining Keystroke Dynamics and Face Recognition for User Verification," 2015 IEEE 18th International Conference on Computational Science and Engineering (pp. 294-299), Oct. 2015.

Office Action dated Nov. 5, 2018 for U.S. Appl. No. 15/048,775, 27 pages.

* cited by examiner

EVENT CHARACTERISTIC ANALYSIS FOR EVENT INPUT DISCRIMINATION

RELATED APPLICATION

The subject application is a continuation of, and claims priority to, U.S. patent application Ser. No. 15/048,775, filed 19 Feb. 2016, and entitled "EVENT CHARACTERISTIC ANALYSIS FOR EVENT INPUT DISCRIMINATION," the entirety of which application is hereby incorporated by reference herein.

TECHNICAL FIELD

The disclosed subject matter relates to an analysis of an event characteristic, e.g., an analysis of an event characteristic can be employed in discriminating between event inputs based on an incongruence related to the event characteristic.

BACKGROUND

By way of brief background, conventional authentication of a user input to a device is "key and lock" type authentication, e.g., a user inputs a password (key) that results in an unlock of a functionality (lock) where the password is determined to match a password on file. More advanced conventional systems can use a multifactor authentication, e.g., two or more pieces of information can be checked (two keys are checked). In some typical multifactor systems, the second key is often a time sensitive code to which only the user is expected to have access. These technologies, however, do not address non-user sources of the keys and, as such, are susceptible to failure. More generally, where input(s) are treated as attributable to only one source, and therefore given a measure of trust, this measure of trust can be leveraged to circumvent typical security measures. As an example, a first user's spoken password can be recorded and then used by a second user to gain improper access premised on an assumption that only the first user will have the voice associated with the first user. This example can also be expanded to multifactor authentication, e.g., the second user can have the first user's mobile device and the recorded password, where the mobile device has the second key and the first key is spoofed with the recorded voice, the security measures are again defeated.

DETAILED DESCRIPTION

Figure 1:
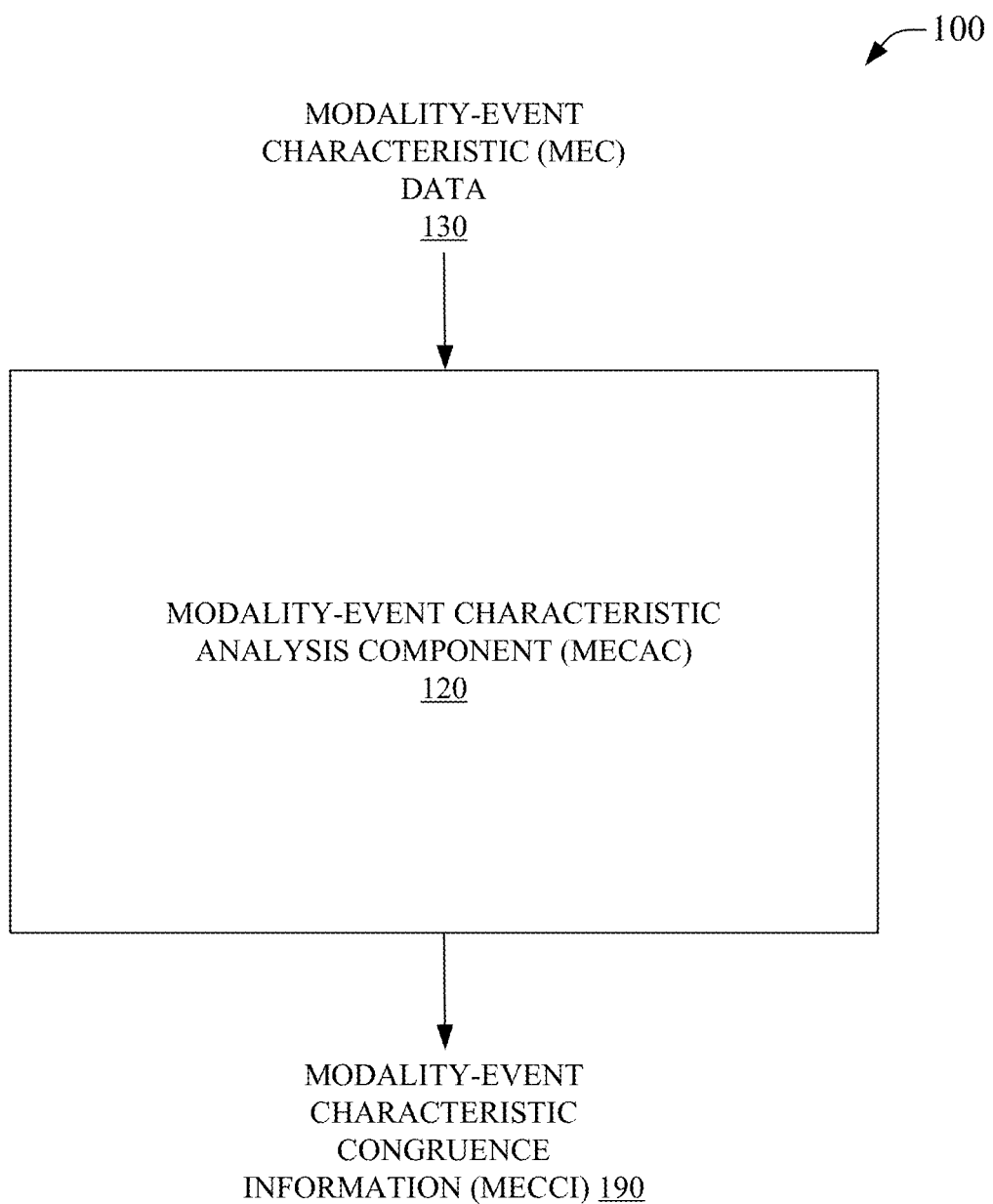
FIG. 1 is an illustration of an example system that facilitates determining a congruence of event characteristics captured for an event via different modalities in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Conventional authentication of a user input to a device, as previously stated, is typically of a "key and lock" type. Keys, such as, user passwords, vocal patterns, fingerprints, iris scans, etc., can result in an unlock of a 'lock', e.g., a functionality, action, alert, system, etc., where the key is determined to match a record on file. More advanced conventional systems can use a multifactor authentication, e.g., two or more pieces of information can be checked (two keys are checked against stored values). These technologies, however, do not address the validity of the source of the key itself, e.g., is the password coming from the actual user associated with the password or, conversely, is the password being presented artificially, and thus these conventional systems can be susceptible to other types of failures, e.g., spoofing, etc., even where the password itself is correct. More generally, where input(s) are de facto treated as valid where correct, rather than valid where correct and validated to a source, they can be leveraged to circumvent typical security measures. As an example, a true user's passcode can be recorded such as by a key logger, etc., and then used by a malicious user to gain access by sending the code electronically rather than physically entering it into a device via a keyboard, touchpad, etc. Where the passcode can be checked against other characteristics of the passcode entry event, e.g., is an actual touch detected on a keypad, touch screen, etc., is a face visible via an onboard camera, is the device in an orientation associated with normal passcode entry (e.g., not face down), can the true user's voice be detected in the background, etc., the validity of the passcode entry can be predicated on a congruence of these additional event characteristics and can improve the security associated with use of the example passcode.

The present disclosure addresses analysis of event characteristics via additional modalities to determine a level of congruence that can facilitate validation of another characteristic of the event. In an aspect, information related to an event can be captured by a plurality of modalities. Characteristics of the event can be extracted from this information, e.g., modality-event characteristics. As an example, entry of text into an email can be associated with physical entry of the text via an input device, movement of the input device associated with the physical entry of the text (finger tapping can cause a device to jiggle), with the device being oriented so as to provide access to the input device (face up), the occasional sound of the user's native language (e.g., office conversation, the user speaking to someone, etc.), an orientation of the user and the device (the user can be in front of and facing the device to enter text) that can be captured by an imaging device, etc. The characteristics of these other aspects of the event can be analyzed to indicate a level of congruence. As an example, where the device is face down, a detected language is foreign, and the device is motionless, etc., it can be determined that the entry of text is not likely due to the user entering the text because there is a low level of congruence between the modality-event characteristics. As a further example, where the device is face up, a background voice attributable to the user's wife and child are detected, the device jiggles in correlation to text entry and is still in periods where text isn't being entered, and a front facing camera captures the user's face, there can be a high level of congruence and the text entry can be treated as likely attributable to the user.

The present disclosure is not limited to determining congruencies for validating text entry and can be applied to nearly any form of input event. As an example, speaking into a corded or cordless microphone attached to a phone can be spoofed by using an antenna to induce currents in a microphone cord or can mimic the data sent from a wireless microphone and received by the phone. This type of event can be analyzed to check for electromagnetic radiation (EM) that has a sufficient level of correlation to the audio signal being received by the phone, e.g., if EM goes up when a spoken word is received and the EM radiation goes down when there is a pause, then there can be a lower level of congruence that can indicate that the audio information may not be from a true user. A further modality-event characteristic can be associated with the phone camera capturing the true user's face and mouth movements, e.g., where the mouth isn't moving in time to the audio information it can be less likely that the true user is generating the audio information, or where the another user's face (not the true user) is detected as prominently before the phone, e.g., by a front facing camera, then it is less likely to be congruent with the audio information and confidence in the source can be decreased. Nearly any event input can be associated with multiple modality-event characteristics that can be analyzed to determine a level of congruence and all such event inputs are to be considered within the scope of the present disclosure even where not expressly disclosed herein for the sake of clarity and brevity.

Rules and profiles can also be employed in conjunction with the analysis of the modality-event characteristics. Rules can relate to broadly applicable conventions, for example, higher security inputs can be accorded higher levels of required congruence, e.g., a password entry can be invalidated without relatively higher levels of congruence as compared to validating a low security entry, e.g., text entry into a calendar application etc., which can be allowed with comparatively low levels of congruence. Profiles can be employed to personalize congruence determinations. As an example, a profile can require that all forms of valid event inputs be determined to have high congruence, low congruence, perfect congruence, etc., that one modality is given more weight than another modality, e.g., facial recognition congruence with an event input be more strongly weighted than an infrared/thermal imaging modality, etc., that a modality-event characteristic be ignored, e.g., that EM radiation modalities not be employed in congruence determination, etc., or nearly any other personalization. Moreover, profiles can comprise characteristics that can be associated with individual true users, for example, images of the user, images of family members, the sound/voices of a true user's office, user schedules, input device types/models/brands/identities, etc. As such, where a plurality of modality-event characteristics are checked, there can be individualization of the congruence determination based on the user profile as well as alteration of the general rules that are applied to the congruence determination via rules.

In some embodiments, congruence determinations can be performed in a device receiving input. In some instances, the device receiving input can gather modality-event characteristic data from other device. In other instances, the input device can be enabled with other sensing equipment to allow collection of modality-event characteristics by the device itself. Modern smartphones, for example, are connected devices that embody numerous sensors, e.g., microphones, camera, tilt sensors, motion sensors, GPS, pressure sensors, touch sensors, fingerprint sensors, etc., and can also be connected to other devices, e.g., via a wired or wireless connection, such as IR sensors, remote cameras, proximity sensors, beacons, etc., that can all source modality-event characteristics to the smartphone contemporaneous with event input at the smartphone. Further, processing of the analysis can occur on the device receiving the event input and/or on other devices located locally or remotely from the event input receiving device. As an example, processing of the analysis can occur in the cloud, e.g., on a remotely located server connected to a device via at least a wired or wireless link, on a local device connected to an event input receiving device, e.g., on a desktop computer validating event input on a proximate tablet computer, or on the event input receiving device itself, e.g., on a smartphone receiving event input on the smartphone itself. Similarly, rules and/or profile information can be stored locally and/or remotely.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages and novel features of the disclosed subject matter will become apparent from the following detailed description when considered in conjunction with the provided drawings.

FIG. 1 is an illustration of a system 100, which facilitates determining a congruence of event characteristics captured for an event via different modalities in accordance with aspects of the subject disclosure. System 100 can comprise modality-event characteristic (MEC) analysis component (MECAC) 120. MECAC 120 can receive MEC data 130 and can determine MEC congruence information (MECCI) 190. MECAC 120 can receive MEC data 130 from one or more sources. MECAC 120 can, in an aspect, extract data related to a characteristic of an event input received via a modality and can analyze the significance of the characteristic in relation to other characteristics from other event input received by other modalities that are contemporaneous with the event. As an example, where an event input is a video signal captured with a first video modality, the characteristic can be a binary state associated with the mouth of a user. This can be analyzed in relation to another event input, for example, an audio event input captured by a microphone modality, wherein the characteristic under analysis is the periodic nature of loud and quiet periods in the audio data. This can be analyzed against a third event input captured by an accelerometer modality, wherein the characteristic is a time variant level of jiggle. These three characteristics can be associated with the same input device and can be contemporaneous. The analysis can then determine a level of congruence between the modality-event characteristics, e.g., how congruous is the mouth moving and sound level, how congruous is the mouth moving and the jitter, how congruous is the sound level and the jiggle, how congruous is the mouth moving, sound level, and jiggle, etc. From this example, where the true user is typing input, the jiggle and sound (tapping sound of a keyboard for example) can be congruous but neither can be congruous with the mouth movement as the true user is perhaps not speaking while typing (although he could be mouthing the words she is typing, which could cause the mouth movement to also be congruous). In another aspect of this example, where the user is doing speech-to-text input, the mouth movement and sound level can be congruous while the jiggle characteristic is not, perhaps the device is sitting on a table while the true user is dictating an email, for example. Of note, only three modality-event characteristics are illustrated in this example, but the disclosure contemplates nearly any number of MECs can be analyzed to determine congruence between one or more MECs.

MEC data 130 can comprise data related to a MEC. As disclosed herein, a MEC can be a characteristic associated with an event and modality. As such, a MEC can typically be extracted from nearly any information source contemporaneously associated with an event. Modalities can include video, images, audio, EM, motion, tilt, proximity, orientation, direction, pressure, temperature, capacitance, resistance, chemical composition, etc., or even information itself, e.g., brand, model, make, manufacturer, source identification, encryption type, identified language or dialect, etc. Moreover, different characteristics can be captured for any given modality, for an example image, color saturation, facial recognition, fingerprint, iris pattern, skyline pattern, logo(s), weather, etc., for an example audio input, volume, frequency, spoken language/dialect, sound pressure, the sound of a train in the background, the sound of a planes in the background, etc. It will be noted that numerous other examples are readily appreciated though they cannot all be explicitly state herein for the sake of brevity and clarity.

The analysis of MEC data 130 by MECAC 120 can result in MECCI 190. MECCI 190 can comprise information associated with congruence between MECs. As such, MECCI 190 can comprise congruence information for some, none, or all MECs associated with MEC data 130. In an aspect, MECCI 190 can comprise information that relates to a level of congruence between MECs that can enable a response to be initiated. As such, where there is a high level of congruence between the MECs associated with an event, 'no action' can be an appropriate response, however, where congruence drops or was low, an alert can be initiated, a lockout can be initiated, tracking can be initiated, etc. Of note, congruence can change, such as over time, for an event. As an example, where a true user logs into an account with high MEC congruence, no action may be initiated, however, where the true user puts down the device without logging out and another user begins entry, the congruence can drop, for example the face may not be recognized, etc., which can cause an alarm to be initiated, for data associated with the drop in congruence to be quarantined, etc. Where, for example, a true user logs into a bank account on his mobile device but does not log out and then his mobile is stolen, a criminal trying to take money out of the bank account, because the true user is still logged in, can have his intentions frustrated where the congruence level has dropped. Other examples will be readily appreciated but are not explicitly recited for brevity, although all such examples are within the scope of the instant disclosure.

Figure 2:
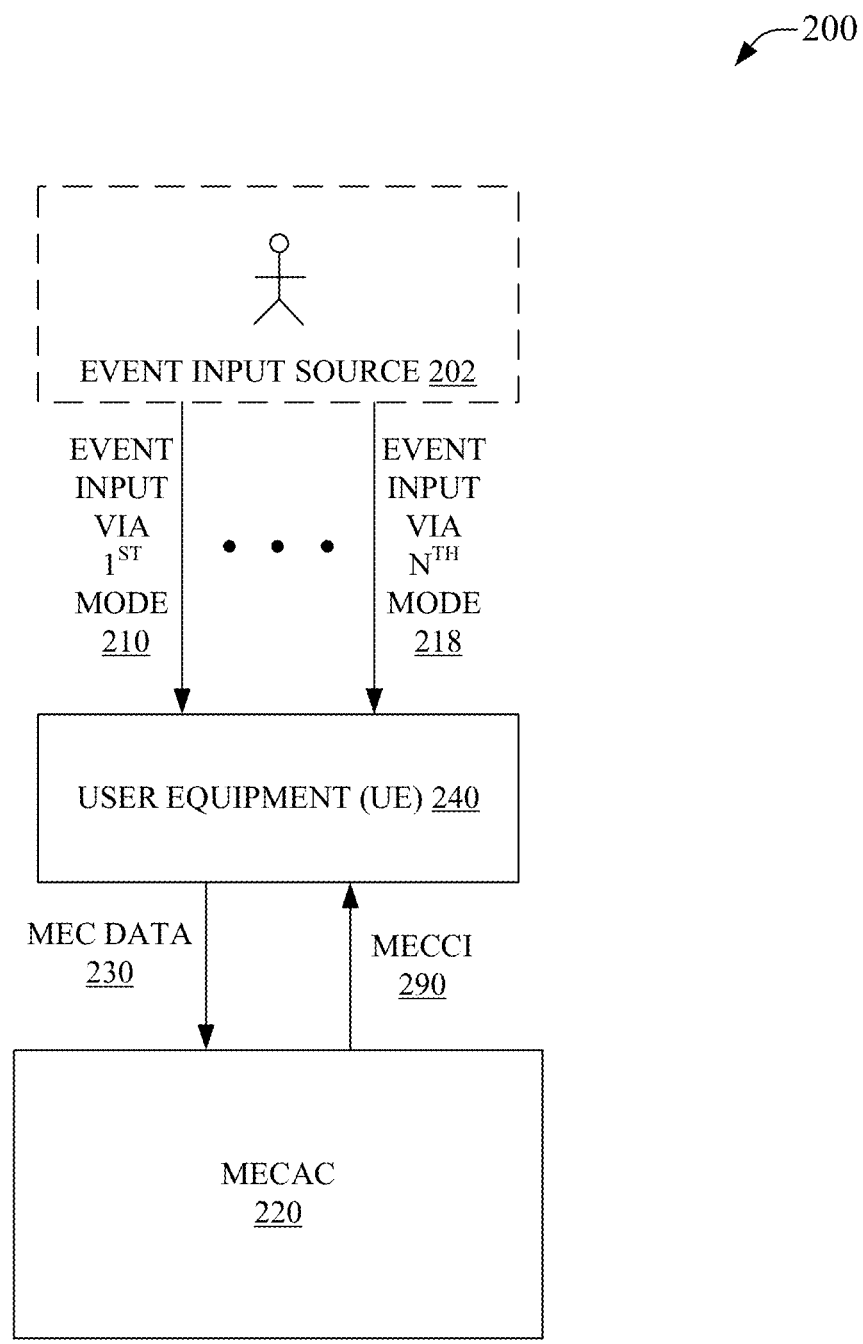
FIG. 2 is a depiction of an example system that facilitates determining a congruence of 1 to N event characteristics captured for an event source via 1 to N different modalities in accordance with aspects of the subject disclosure.

FIG. 2 is a depiction of a system 200 that can facilitate determining a congruence of 1 to N event characteristics captured for an event source via 1 to N different modalities in accordance with aspects of the subject disclosure. System 200 can comprise MECAC 220. MECAC 220 can receive MEC data 230 and can determine MECCI 290. MECAC 220 can receive MEC data 230 from one or more sources.

System 200 can comprise event input source 202. Event input source can be proximate to user equipment (UE) 240. UE 240 can receive an event input from event input source 202, e.g., event input via $1^{st}$ mode 210 to event input via $N^{th}$ mode 218. Event input source 202 can be detectable or observable by UE 240, wherein the detection and observation ca be by way of event input via $1^{st}$ mode 210 to event input via $N^{th}$ mode 218. In an aspect, event input source 202 can be any event that allows for detection or observation of, e.g., receiving of, event input via $1^{st}$ mode 210 to event input via $N^{th}$ mode 218. As an example, event input source 202 can be a user entering a password, whereby event input via $1^{st}$ mode 210 to event input via $N^{th}$ mode 218 can comprise the password entry, an image of the user entering the password, audio captured from the area proximate to the user entering the password, EM radiation from the area proximate to the user entering the password, facial recognition information, motion information of the UE or of the area proximate to the user entering the password, etc. As another example, event input source 202 can be a user using near field communication (NFC) enabled credit card to pay for items or services, whereby input via $1^{st}$ mode 210 to event input via $N^{th}$ mode 218 can comprise NFC information, an image of the credit card user, audio captured from the area proximate to the user, EM radiation from the area proximate to the user, facial recognition information, motion information of the UE or of the area proximate to the user, or nearly any other information related to the event determined contribute to the scene, e.g., the event input source 202.

UE 240 can, in an aspect, simply pass input via event input via $1^{st}$ mode 210 to event input via $N^{th}$ mode 218 as MEC data 230 to MECAC 220. In another aspect, UE 240 can extract or determine MEC data 230 from input from event input via $1^{st}$ mode 210 to event input via $N^{th}$ mode 218 before enabling access to MEC data 230 by MECAC 220. In some embodiments, UE 240 can comprise MECAC 220. In other instances, MECAC 220 can be discrete and separate from UE 240 and located local to, or remote from, UE 240. Event input via $1^{st}$ mode 210 to event input via $N^{th}$ mode 218 can comprise information about event input source 202 that can enable extraction or determination of characteristics of event input source 202. As such, MEC data 230 can comprise information about the characteristics of event input source 202 with regard to the modality that is associated with the capture of the information leading to the characteristic. As an example, where the $1^{st}$ mode is an image of a user, event input via $1^{st}$ mode 210 can comprise information about the image that can facilitate extraction of characteristics about the image, e.g., facilitating facial recognition, iris pattern detection, hair color, eye color, physiological aspects of the user that can be derived from the image such as flared nostrils, flushed cheeks, bloodied lip, wearing makeup, the presence of glasses/contact lenses, etc. These characteristics can be embodied in MEC data 230 to facilitate MECAC 220 in determining a congruence of the characteristics across a plurality of modalities, e.g., via event input via $1^{st}$ mode 210 to event input via $N^{th}$ mode 218 presented as MEC 230 to MECAC 220.

In an aspect, MECAC 220 can extract data related to a characteristic of an event input received via a modality and can analyze the significance of the characteristic in relation to other characteristics from other event input received by other modalities that are contemporaneous with the event, e.g., event input via $1^{st}$ mode 210 to event input via $N^{th}$ mode 218. As an example, where an event input is a video signal captured with a first video modality, the characteristic be a state associated with the eye movement of a user. This can be analyzed in relation to another event input, for example, an audio event input captured by a microphone modality, wherein the characteristic can be a determined level of tension in the voice based on vocal analysis. This can be analyzed against other event inputs from event input source 202. These three characteristics can be associated with the same input device, e.g., UE 240, and can be contemporaneous. The analysis can then determine a level of congruence between the modality-event characteristics, e.g., how congruous is the eye movement and vocal stress level, how congruous is the eye movement and the other characteristics, etc. From this example, where the true user is displays rapid eye movement and has a high level of vocal stress, it can be determined that the user is acting under duress, that the user is violating a social norm, etc.

MEC data 230 can comprise data related to a MEC. As disclosed herein, a MEC can be a characteristic associated with an event and modality. As such, a MEC can typically be extracted from nearly any information source contemporaneously associated with an event, e.g., event input via $1^{st}$ mode 210 to event input via $N^{th}$ mode 218. Modalities can include video, images, audio, EM, motion, tilt, proximity, orientation, direction, pressure, temperature, capacitance, resistance, chemical composition, etc., or even information itself, e.g., brand, model, make, manufacturer, source identification, encryption type, identified language or dialect, etc. Moreover, different characteristics can be captured for any given modality, for an example image, color saturation, facial recognition, fingerprint, iris pattern, skyline pattern, logo(s), weather, etc., for an example audio input, volume, frequency, spoken language/dialect, sound pressure, the sound of a train in the background, the sound of a planes in the background, etc. It will be noted that numerous other examples are readily appreciated though they cannot all be explicitly state herein for the sake of brevity and clarity.

The analysis of MEC data 230 by MECAC 220 can result in MECCI 290. MECCI 290 can comprise information associated with congruence between MECs. As such, MECCI 290 can comprise congruence information for some, none, or all MECs associated with MEC data 230. In an aspect, MECCI 290 can comprise information that relates to a level of congruence between MECs that can enable a response to be initiated. As such, where there is a low level of congruence between the MECs associated with an event, an action can be an appropriate response. Where, for example, MECCI 290 indicates a high level of congruence for rapid eye movement and high vocal stress for a customer in line at a bank, an alert can be sent to bank security regarding the 'nervous' customer. As another example, where MECCI 290 indicates a high level of congruence for rapid eye movement and high vocal stress while a user is online shopping via a mobile device, e.g., UE 240, a customer service session can be initiated via the mobile device to aid the anxious user with their purchase. Other examples will be readily appreciated but are not explicitly recited for brevity, although all such examples are within the scope of the instant disclosure. Of note, congruence can change, such as over time, for an event.

Figure 3:
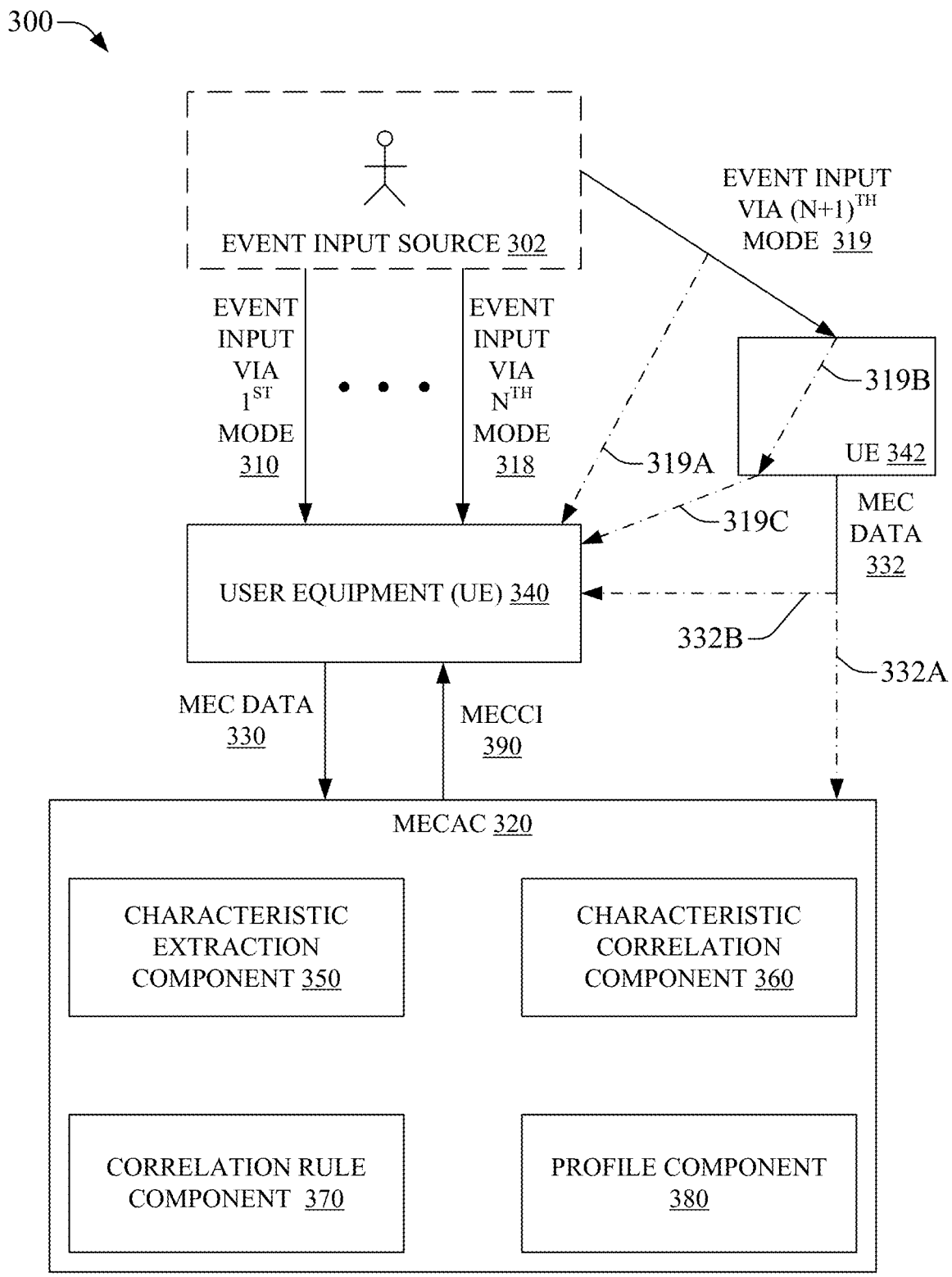
FIG. 3 illustrates an example system that facilitates determining a congruence of event characteristics captured for an event source via different modalities and via a plurality of user equipments in accordance with aspects of the subject disclosure.

FIG. 3 illustrates a system 300 that facilitates determining a congruence of event characteristics captured for an event source via different modalities and via a plurality of user equipments in accordance with aspects of the subject disclosure. System 300 can comprise MECAC 320. MECAC 320 can receive MEC data 330 and can determine MECCI 390. MECAC 320 can receive MEC data 330 from one or more sources, e.g., UE 340, UE 342, etc.

System 300 can comprise event input source 302. Event input source can be proximate to UE 340, 342, etc. UE 340 can receive an event input from event input source 302, e.g., event input via $1^{st}$ mode 310 to event input via $N^{th}$ mode 318. UE 342 can receive an event input from event input source 302, e.g., event input via $(N+1)^{th}$ mode 319. Event input source 302 can be detectable or observable by UE 340, 342, etc., wherein the detection and observation can be by way of event input via $1^{st}$ mode 310 to event input via $(N+1)^{th}$ mode 319. In an aspect, event input source 302 can be any event that allows for detection or observation of, e.g., receiving of, event input via $1^{st}$ mode 310 to event input via $(N+1)^{th}$ mode 319. As an example, event input source 302 can be a driver asking for directions via a vehicle navigation system, whereby event input via $1^{st}$ mode 310 to event input via $(N+1)^{th}$ mode 319 can comprise vocalization of an address, an image of the driver, an image of surrounding traffic, an image of any passengers, audio captured from the area proximate to the driver, facial recognition information, motion information of the UE, e.g., UE 340, 342, the vehicle, etc.

UE 340, 342, etc., can, in an aspect, provide input via event input via $1^{st}$ mode 310 to event input via $(N+1)^{th}$ mode 319 in an unchanged form as MEC data 330/332 to MECAC 320. In another aspect, UE 340, 342, etc., can extract or determine MEC data 330 from input from event input via $1^{st}$ mode 310 to event input via $(N+1)^{th}$ mode 319 before enabling access to MEC data 330/332 by MECAC 320. In some embodiments, UE 340, 342, etc., can comprise MECAC 320. In other instances, MECAC 320 can be discrete and separate from UE 340, 342, etc., and located local to, or remote therefrom. Event input via $1^{st}$ mode 310 to event input via $(N+1)^{th}$ mode 319 can comprise information about event input source 302 that can enable extraction or determination of characteristics of event input source 302. As such, MEC data 330/332 can comprise information about the characteristics of event input source 302 with regard to the modality that is associated with the capture of the information leading to the characteristic. These characteristics can be embodied in MEC data 330/332 to facilitate MECAC 320 in determining a congruence of the characteristics across a plurality of modalities, e.g., via event input via $1^{st}$ mode 310 to event input via $(N+1)^{th}$ mode 319 presented as MEC 330/332 to MECAC 320.

In an aspect, MECAC 320 can extract data related to a characteristic of an event input received via a modality and can analyze the significance of the characteristic in relation to other characteristics from other event input received by other modalities that are contemporaneous with the event, e.g., event input via $1^{st}$ mode 310 to event input via $(N+1)^{th}$ mode 319. This can be analyzed against other event inputs from event input source 302. These characteristics can be associated with the same event input source 302 via input device(s), e.g., UE 340, 342, etc., and can be contemporaneous. The analysis can then determine a level of congruence between the modality-event characteristics.

In an aspect, the inclusion of UE 342 can present several pathways for access to event input via $(N+1)^{th}$ mode 319. In a first embodiment, event input via $(N+1)^{th}$ mode 319 can be simultaneously captured by UE 340 and UE 342. In another embodiment, event input via $(N+1)^{th}$ mode 319 can be captured by UE 342 and passed to UE 340 via path 319A-C. Whereby UE 340 can then pass event input via $(N+1)^{th}$ mode 319, via path 319C, to MECAC 320 as MEC data 330. Furthermore, UE 342 can receive event input via $(N+1)^{th}$ mode 319 and enable access to corresponding MEC data 332. MEC data 332 can be accessed by MECAC 320 via path 332A and/or from UE 340 via path 332B as part of MEC data 330, e.g., MEC data 332 can be incorporated into MEC data 330 when received by UE 340 from UE 342 via path 332B.

MEC data 330, 332, etc., can comprise data related to a MEC. As disclosed herein, a MEC can be a characteristic associated with an event and modality. As such, a MEC can typically be extracted from nearly any information source contemporaneously associated with an event, e.g., event input via $1^{st}$ mode 310 to event input via $(N+1)^{th}$ mode 319. Modalities can include video, images, audio, EM, motion, tilt, proximity, orientation, direction, pressure, temperature, capacitance, resistance, chemical composition, etc., or even information itself, e.g., brand, model, make, manufacturer, source identification, encryption type, identified language or dialect, etc. Moreover, different characteristics can be captured for any given modality, for an example image, color saturation, facial recognition, fingerprint, iris pattern, skyline pattern, logo(s), weather, etc., for an example audio input, volume, frequency, spoken language/dialect, sound pressure, the sound of a train in the background, the sound of a planes in the background, etc. It will be noted that numerous other examples are readily appreciated though they cannot all be explicitly stated herein for the sake of brevity and clarity.

The analysis of MEC data 330, 332, etc., by MECAC 320 can result in MECCI 390. MECCI 390 can comprise information associated with congruence between MECs. As such, MECCI 390 can comprise congruence information for some, none, or all MECs associated with MEC data 330, 332, etc. In an aspect, MECCI 390 can comprise information that relates to a level of congruence between MECs that can enable a response to be initiated. As such, the level of congruence between the MECs associated with an event can be associated with a response determined to be appropriate. Of note, congruence can change, such as over time, for an event.

MECAC 320 can, as illustrated, comprise characteristic extraction component 350. Characteristic extraction component 350 can extract a value ascribed to characteristic based on MEC data 330, 332, etc. As an example, MEC data 330 can comprise information related to an audio modality associated with event input source 302. Characteristic extraction component 350, in this example, can extract certain time-frequency relationships, amplitude-time relationships, Fourier or other transform information, etc., from the information related to the audio input to enable this characteristic to be analyzed for congruence with other characteristics. Further, MECAC 320 can comprise characteristic correlation component 360. Characteristic correlation component 360 can determine a correlation between characteristics, e.g., characteristics extracted from MEC data 330, 332, etc., via characteristic extraction component 350. In an aspect this can allow for exclusion of uncorrelated characteristics in determining a level of congruence between characteristics.

In an aspect, MECAC 320 can also comprise correlation rule component 370 and profile component 380. Rules and profiles can also be employed in conjunction with the analysis of the modality-event characteristics. Correlation rule component 370 can facilitate access to one or more rule, wherein a rule relates to broadly applicable conventions related to determining a level of congruence. As an example, a rule can relate to determining similarity between waveforms, applying threshold values, defining normal rates of change in MEC values, etc. In an aspect, a rule can be stored by correlation rule component 370 or can be received by correlation rule component 370, such as from a local or remotely located data store.

Profiles, in comparison to rules, can be employed to personalize congruence determinations. Profile component 380 can enable access to a profile value comprised in one or more profiles. In an aspect, a profile can be stored by profile component 380 or can be received by profile component 380, such as from a local or remotely located data store. A profile value, for example, can indicate weighting of modalities whereby some modalities can have a greater impact on MECCI 390 than other modalities, can indicate modalities that are to be ignored, modalities that are to always be used, etc., can designate different rankings of modalities for different UEs, etc. As an example, a profile can indicate that a video modality is to always be employed in determining the level of congruence but that the video source should be selected from the UE, e.g., selecting between UE 340, 342, etc., that has the highest resolution video stream. Moreover, profiles can comprise characteristics that can be associated with individual true users, for example, images of the user, images of family members, the sound/voices of a true user's office, user schedules, input device types/models/brands/identities, etc. As such, where a plurality of modality-event characteristics are checked, there can be individualization of the congruence determination based on the user profile, via profile component 380, as well as application of updateable general rules, via correlation rule component 370, that can be applied to the congruence determination.

Figure 4:
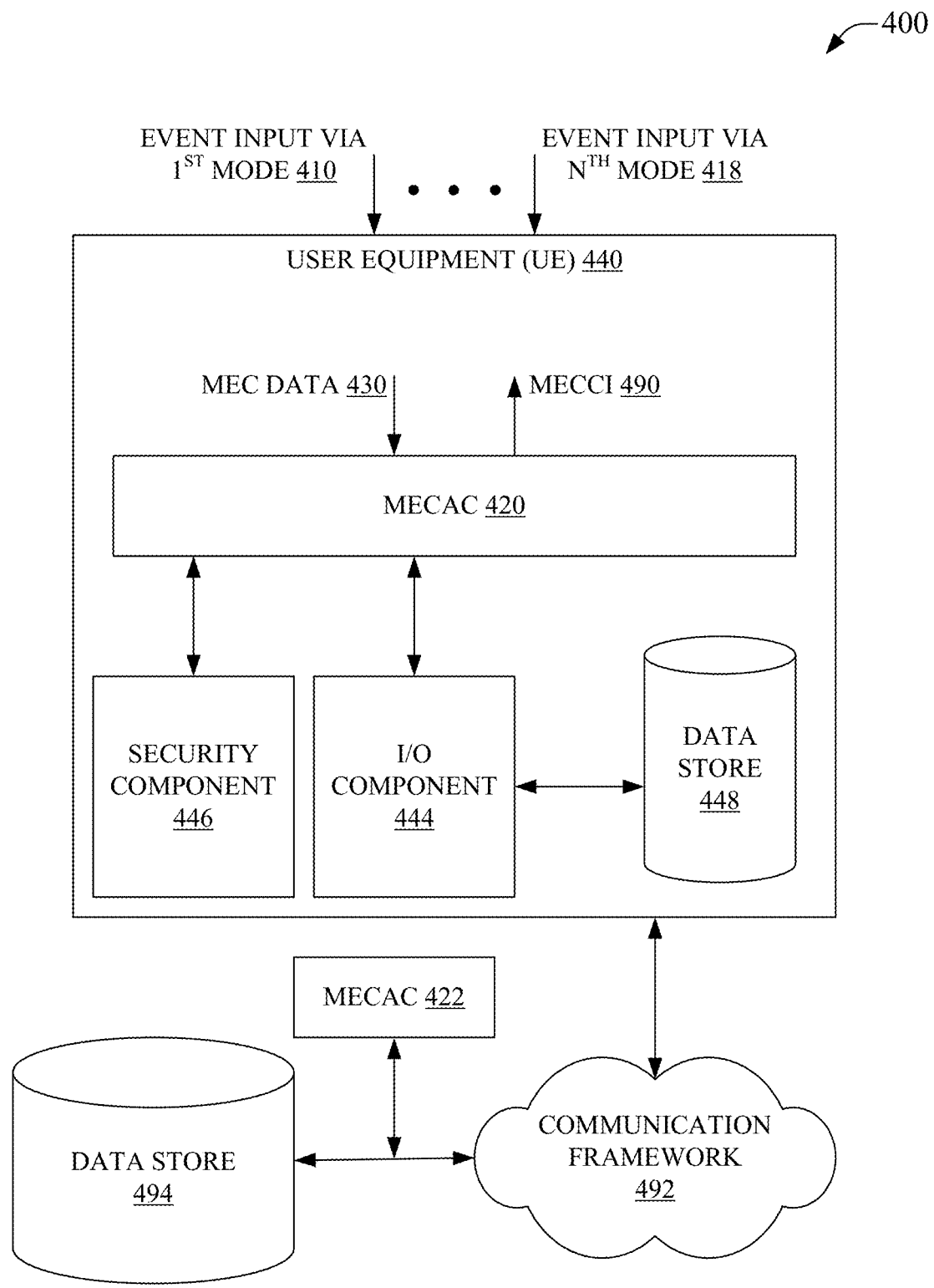
FIG. 4 illustrates an example system that facilitates determining a congruence of event characteristics captured for an event via different modalities employing a remotely located analysis component in accordance with aspects of the subject disclosure.

FIG. 4 illustrates a system 400 that facilitates determining a congruence of event characteristics captured for an event via different modalities employing a remotely located analysis component in accordance with aspects of the subject disclosure. System 400 can comprise MECAC 420. MECAC 420 can receive MEC data 430 and can determine MECCI 490. MECAC 420 can receive MEC data 430 from one or more sources related to an event input source 402. Event input source can be proximate to user equipment (UE) 440. UE 440 can receive an event input from the event input source, e.g., event input via $1^{st}$ mode 410 to event input via $N^{th}$ mode 418. An event input source can be detectable or observable by UE 440, wherein the detection and observation ca be by way of event input via $1^{st}$ mode 410 to event input via $N^{th}$ mode 418.

UE 440 can, in an aspect, simply pass input via event input via 1$^{st}$ mode 410 to event input via N$^{th}$ mode 418 to MECAC 420 as MEC data 430. In another aspect, UE 440 can extract or determine MEC data 430 from input from event input via 1$^{st}$ mode 410 to event input via N$^{th}$ mode 418 before enabling access to MEC data 430 by MECAC 420. Event input via 1$^{st}$ mode 410 to event input via N$^{th}$ mode 418 can comprise information about an event input source that can enable extraction or determination of characteristics of the event input source. As such, MEC data 430 can comprise information about the characteristics of the event input source via the modality that is associated with the capture of the information. These characteristics can be embodied in MEC data 430 to facilitate MECAC 420 in determining a congruence of the characteristics across a plurality of modalities, e.g., via event input via 1$^{st}$ mode 410 to event input via N$^{th}$ mode 418. Characteristics can be analyzed in relation to another characteristic associated with another modality for capturing information related to the event input. The analysis can then determine a level of congruence between the modality-event characteristics.

MEC data 430 can comprise data related to a MEC. As disclosed herein, a MEC can be a characteristic associated with an event and modality. As such, a MEC can typically be extracted from nearly any information source contemporaneously associated with an event, e.g., event input via 1$^{st}$ mode 410 to event input via N$^{th}$ mode 418. Modalities can include video, images, audio, EM, motion, tilt, proximity, orientation, direction, pressure, temperature, capacitance, resistance, chemical composition, etc., or even information itself, e.g., brand, model, make, manufacturer, source identification, encryption type, identified language or dialect, etc. Moreover, different characteristics can be captured for any given modality, for an example image, color saturation, facial recognition, fingerprint, iris pattern, skyline pattern, logo(s), weather, etc., for an example audio input, volume, frequency, spoken language/dialect, sound pressure, the sound of a train in the background, the sound of a planes in the background, etc. It will be noted that numerous other examples are readily appreciated though they cannot all be explicitly state herein for the sake of brevity and clarity.

The analysis of MEC data 430 by MECAC 420 can result in MECCI 490. MECCI 490 can comprise information associated with congruence between MECs. As such, MECCI 490 can comprise congruence information for some, none, or all MECs associated with MEC data 430. In an aspect, MECCI 490 can comprise information that relates to a level of congruence between MECs that can enable a response to be initiated. Of note, congruence can change, such as over time, for an event.

MECAC 420 can be communicatively coupled to a security component of UE 440. As such, a response can be triggered by MECAC 420 based on a level of congruence between MECs. This can be in addition to facilitating access to MECCI 490 via MECAC 420. As an example, a response can cause security component 446 to reject input associated with an event input to UE 440, terminate or suspend access to data or resources of UE 440, request additional validation, cause an alarm, etc. In another aspect, security component 446 can communicate information, via input/output (I/O) component 444 of UE 440 to external devices or systems (no illustrated), e.g., via communication framework 492.

UE 440 can comprise I/O component 444 that can facilitate communication between MECAC 420 and other devices or systems, both internal and external to UE 440. In an aspect, MECCI 490 can be stored at data store 448, 494, etc., shared with MECAC 422, etc., or with another local or remotely located device, such as a remote server, etc., via communications framework 492 by way of I/O component 444. In a further aspect, rule and/or profile information can be received at MECAC 420 via I/O component 444, e.g., from data store 448, 494, etc., or from other local or remote devices, etc., via communication framework 492.

Figure 5:
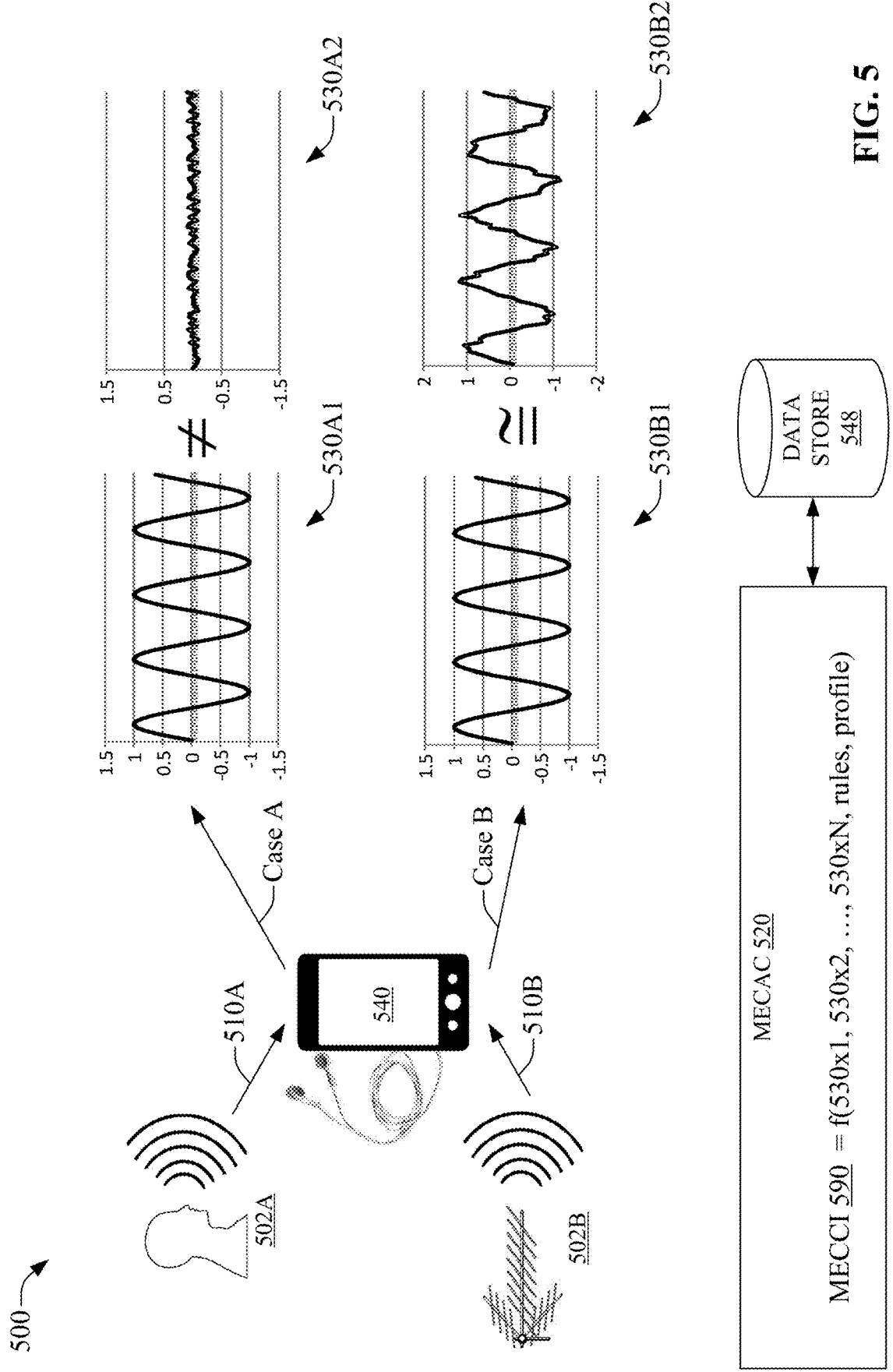
FIG. 5 illustrates an example of depicting determining a congruence of event characteristics captured for an event via different modalities in accordance with aspects of the subject disclosure.

FIG. 5 is a diagram 500 that depicts determining a congruence of event characteristics captured for an event via different modalities in accordance with aspects of the subject disclosure. Diagram 500 illustrates UE 540 with a wired headphone/microphone attachment. Of note, it has been shown that EM radiation can be used to spoof vocal input to a microphone in this arrangement, e.g., an EM signal can be used to imitate user voice commands by inducing currents in the microphone wires for the headset attachment. At 502A, a true user can vocalize into the microphone of the headset attached to 540, e.g., via 510A. UE 540 can comprise a MECAC, e.g., MECAC 520, etc. In the case of the true user vocalizing, MEC data 530A can comprise characteristic information 530A1 for a microphone modality, e.g., frequency or amplitude over time, etc., and EM characteristic 530A2, e.g., relating an amount of EM radiation received by UE 540 contemporaneously with the microphone characteristic. Where the true user is vocalizing, EM radiation can be low and substantially different in character from the microphone characteristic. This can be associated with a level of congruence indicating that it is unlikely that EM radiation caused the detected microphone characteristic, e.g., that the microphone reflects a true vocal signal received by the microphone. In contrast, where antenna 502B produces EM radiation that induces a microphone-like current detected by UE 540, e.g., at 510B, this can be associated with MEC 530B. MEC 530B can comprise a microphone characteristic and EM characteristic similar to 530A, however, in the case where antenna 502B is sending the EM radiation, EM characteristic 530B2 can be substantially non-zero. In some instances, EM characteristic 530B2 can be determined to be similar to microphone characteristic 530B1. This can lead to a different determined level of congruence between 530B1 and 530B2 than was determined for 530A1 and 530A2. In response to the similarity between 530B1 and 530B2, it can be determined that 502B can be attempting to spoof a vocal input such as 502A. As such, MECCI data, e.g., 590, etc., can be employed to initiate a response to the determined level of congruence, e.g., in the 'A case' the level of congruence can result in allowing the vocal input, and in the 'B case' the different level of congruence can result in disallowing the possibly spoofed vocal input.

In some embodiments, UE 540 can comprise MECAC 520. In other embodiments, MECAC 520 can be located locally or remotely from UE 540. MECAC 520 can determine MECCI 590 based on MECs, such as those contained in 530A, 530B, etc., e.g., 530A1, 530A2, 530B1, 530B2. Moreover, MECCI 590 can be further based on a rule and/or a profile, as disclosed herein. In an embodiment, MECCI 590 can be determined from a formula such as: f(530x1, 530x2, . . . , 530xN, rule, profile), where the notation 530x1 can be 530A1 in the 'A case' and 530B1 in the 'B case'. Further, MECCI 590, a rule, or profile data of a profile can be stored and communicated to/from data store 548. In some embodiments, data store 548 can be comprised in UE 540. In other embodiments, data store 548 can be located local to, or remote from, UE 540.

Figure 6:
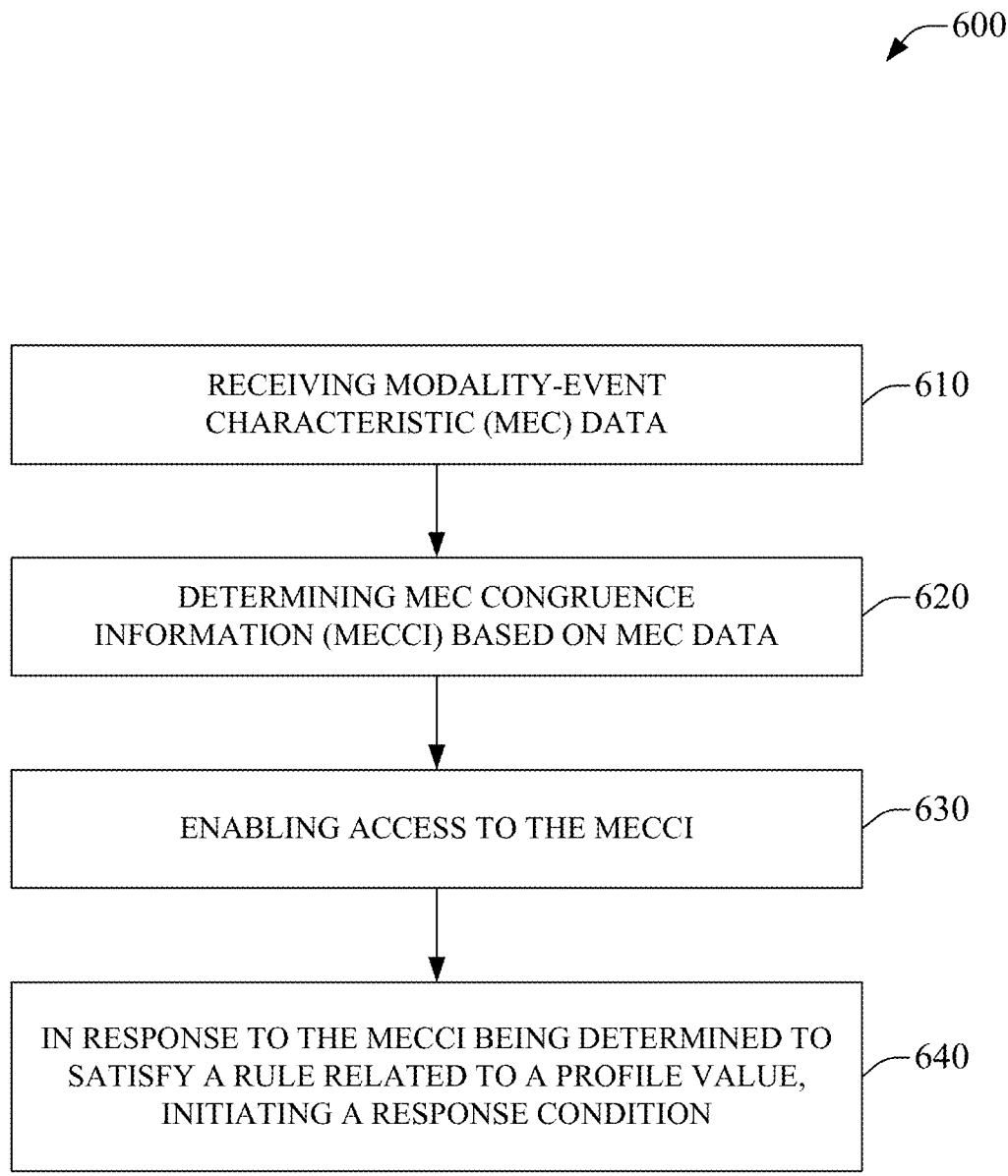
FIG. 6 illustrates an example method facilitating initiating a response based on determining a congruence of event characteristics captured for an event via different modalities in accordance with aspects of the subject disclosure.
Figure 7:
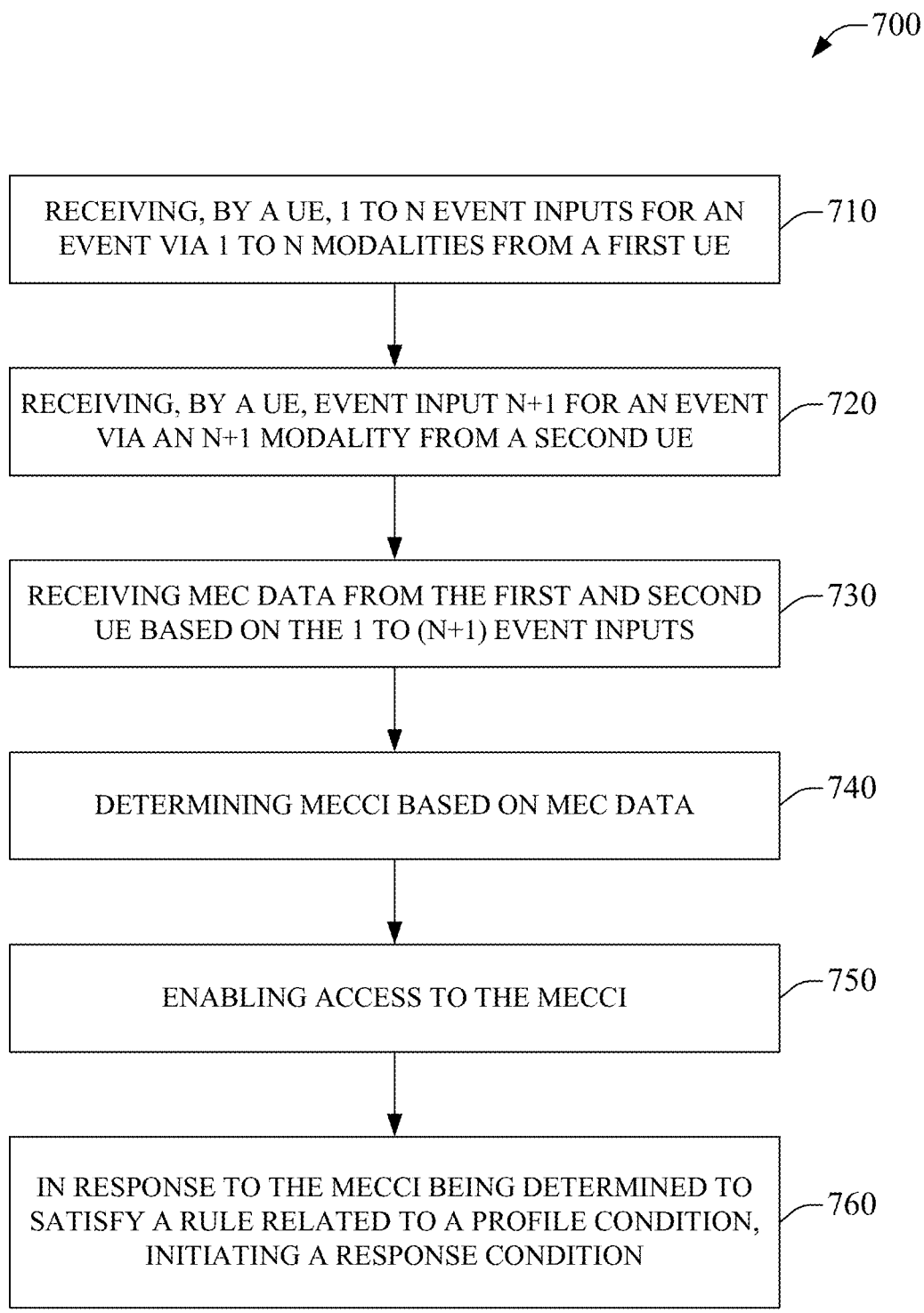
FIG. 7 depicts an example method facilitating determining a congruence of 1 to (N+1) event characteristics captured for an event source via 1 to (N+1) different modalities from a plurality of user equipments in accordance with aspects of the subject disclosure.
Figure 8:
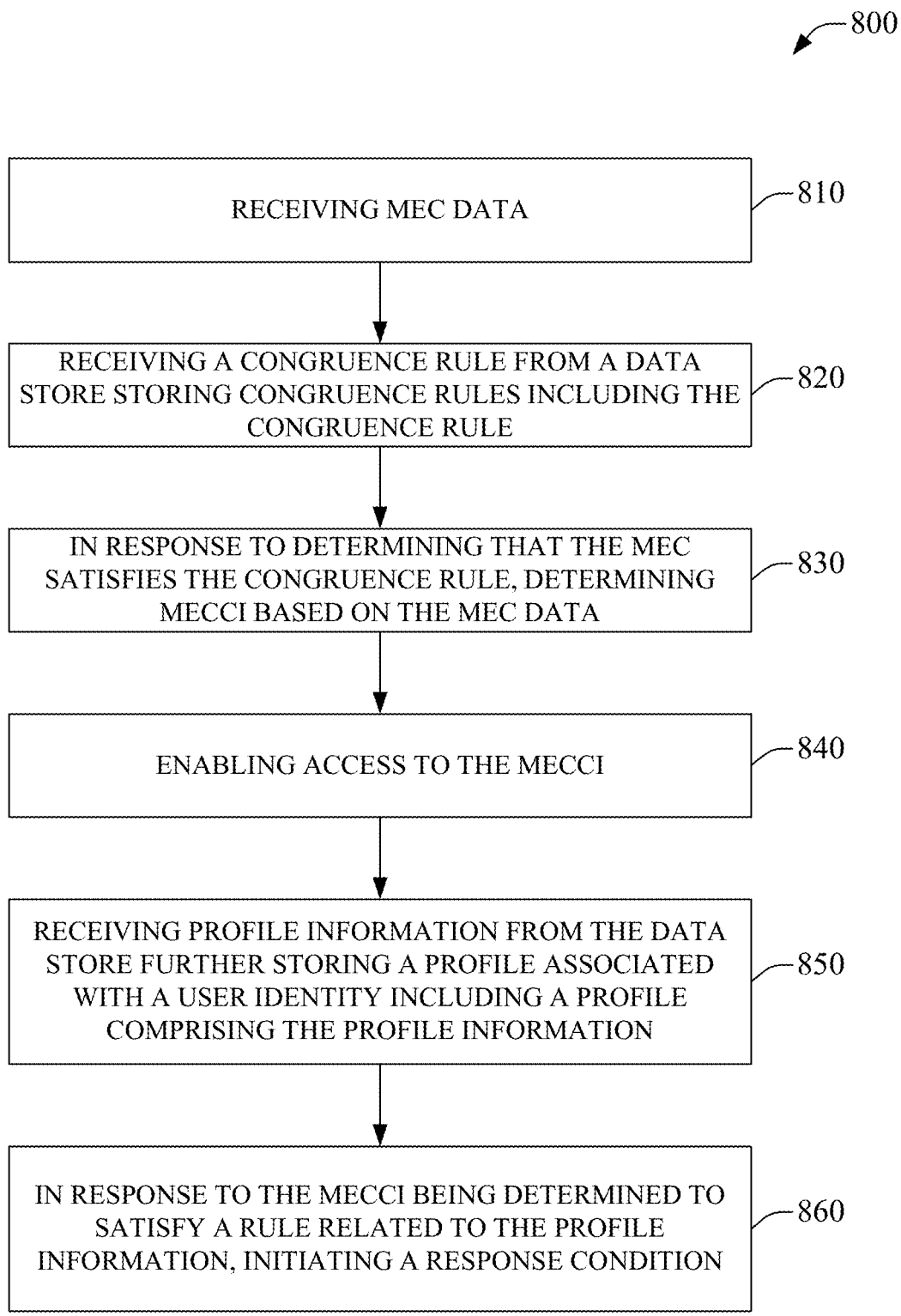
FIG. 8 illustrates an example method facilitating determining a congruence of event characteristics captured for an event via different modalities based on remotely stored rules in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 illustrates a method 600 that facilitates initiating a response based on determining a congruence of event characteristics captured for an event via different modalities in accordance with aspects of the subject disclosure. At 610, method 600 can comprise receiving modality-event characteristic (MEC) data. MEC data can comprise data related to a MEC. As disclosed herein, a MEC can be a characteristic associated with an event and modality. As such, a MEC can be extracted from nearly any information source contemporaneously associated with an event via a given modality. Modalities can include video, images, audio, EM, motion, tilt, proximity, orientation, direction, pressure, temperature, capacitance, resistance, chemical composition, etc., or even information itself, e.g., brand, model, make, manufacturer, source identification, encryption type, identified language or dialect, etc. Moreover, different characteristics can be captured for any given modality, for an example image, color saturation, facial recognition, fingerprint, iris pattern, skyline pattern, logo(s), weather, etc., for an example audio input, volume, frequency, spoken language/dialect, sound pressure, the sound of a people in the background, the sound of a traffic in the background, etc. It will be noted that numerous other examples can be readily raised though they cannot all be explicitly stated herein for the sake of brevity and clarity.

MEC data can be related to an event input source that can be proximate to a user equipment (UE). A UE can receive an event input from an event input source, e.g., as an event input via an $N^{th}$ mode, e.g., 210-218, 310-319, 410-418, etc. An event input source can be detectable or observable by UE, wherein the detection and observation can be by way of the event input via the $N^{th}$ mode, for example the event input via an $N^{th}$ mode can comprise password entry, an image of a user, audio captured from an area proximate to a user, EM radiation from an area proximate to a user, facial recognition information, motion information of the UE or of the area proximate to the UE, etc.

At 620, method 600 can comprise determining MEC congruence information (MECCI) based on MEC data from 610. A characteristic of an event input received via a modality can be extracted from MEC data and be employed in an analysis of the significance of the characteristic in relation to other characteristics from other event inputs received by other modalities that are contemporaneous with the event. As an example, where an event input is a video signal captured with a first video modality, the characteristic be a state associated with the finger movement of a user. This can be analyzed in relation to another event input, for example, an amount of jiggle captured by an accelerometer modality. This can be analyzed against other event inputs from an event input source. These characteristics can be associated with the same input device, e.g., a UE, smartphone, tablet, wearable device, vehicle, keyboard, touchscreen, microphone, internet of things (IOT) enabled device, etc. The analysis can then determine a level of congruence between the modality-event characteristics, e.g., how congruous is the finger movement and jiggle level, how congruous is the finger movement and the other characteristics, how congruous is the jiggle level and the other characteristics, etc. From this example, where a true user is tapping in a password on a touch screen mobile device, the finger movement can be highly congruous with the jiggle levels over time, which can be employed to assert that the true user is entering the password being received, e.g., the finger movement appear to match the shaking of the mobile device in time and it can be more likely that it is an actual entry of the password data than if the finger movements did not 'match' the jiggle of the device. As an example where the mobile is perfectly still, it is less likely the user is actually tapping the touchscreen to enter the password data. Where a third, fourth, etc., MEC is also analyzed for congruence, this can result in further refinement of the determined level of congruence between the characteristics and the entry of the password. For example, where the third MEC relates to the orientation of the device, where it is determined that the device is face down, and the fourth MEC relates to a front facing series of images, which are determined to be black (as would occur where a device is face down on a table), the level of congruence of the four MECs can be low, namely that even though there is finger movement and jiggle, these are offset by device orientation and an image of a table top so close to the device front that actually tap entry of a password is unlikely. The MEC congruence, e.g., MECCI, can be employed to initiate a response.

At 630, MECCI can be made available for access by other devices, systems, methods, etc. In an aspect, MECCI can be made available to a UE associated with receiving event information to enable the UE to respond to the input event based on the levels of congruence determined, e.g., different combinations of event inputs via different modalities, and MECs related thereto, can have different levels of congruence for each combination. By selecting a relevant combination of MECs, the associated determined level of congruence can be employed in determining a corresponding response.

At 640, method 600 can include, in response to the MECCI being determined to satisfy a rule related to a profile value, initiating a response condition. At this point, method 600 can end. Rules and profiles can also be employed in conjunction with the analysis of the modality-event characteristics. A rule can impart broadly applicable conventions to determining a level of congruence. As an example, a rule can relate to determining similarity between waveforms, applying threshold values, defining normal rates of change in MEC values, etc. Profiles, in comparison to rules, can be employed to personalize congruence determinations. A profile value can be comprised in one or more profiles. A profile value, for example, can indicate weighting of modalities whereby some modalities can have a greater impact on MECCI than other modalities, can indicate modalities that are to be ignored, modalities that are to always be used, etc., can designate different rankings of modalities for different UEs, etc. As an example, a profile can indicate that a video modality is to always be employed in determining the level of congruence but that multiple video sources should be selected when available. Moreover, profiles can comprise characteristics that can be associated with individual true users, for example, images of the user, images of family members, the sound/voices of a true user's office, user schedules, input device types/models/brands/identities, etc. As such, where a plurality of modality-event characteristics are checked, there can be individualization of the congruence determination based on the user profile, as well as application of updateable general rules, that can be applied to the congruence determination.

FIG. 7 illustrates a method 700 that facilitates determining a congruence of 1 to (N+1) event characteristics captured for an event source via 1 to (N+1) different modalities from a plurality of user equipments in accordance with aspects of the subject disclosure. At 710, method 700 can comprise receiving 1 to N event inputs for an event via 1 to N modalities via a first UE. At 720, method 700 can comprise receiving, by a second UE, an $(N+1)^{th}$ event via a $(N+1)^{th}$ modalities for the event. A UE can receive an event input from an event input source, e.g., as an event input via a $1^{st}$ modality, $2^{nd}$ modality, ..., $N^{th}$ modality, $(N+1)^{th}$ modality, etc., e.g., 210-218, 310-319, 410-418, etc. An event input source can be detectable or observable by a first UE, second UE, etc., wherein the detection and observation can be by way of the event input via the P modality, $2^{nd}$ modality, ..., $N^{th}$ modality, $(N+1)^{th}$ modality, etc.

At 730, MEC data can be received from the first UE, second UE, etc., based on the 1 to (N+1) event inputs received by the UEs at 710 and 720. MEC data can be related to an event input source that can be proximate to the first UE, the second UE, etc. The 1 to (N+1) event inputs can inherently or explicitly comprise MEC data, e.g., the MEC data can comprise data related to a MEC of each modality-event associated with the event input source. As disclosed herein, a MEC can be a characteristic associated with an event and modality. As such, a MEC can be extracted from nearly any information source contemporaneously associated with an event via a given modality. Modalities can include video, images, audio, EM, motion, tilt, proximity, orientation, direction, pressure, temperature, capacitance, resistance, chemical composition, etc., or even information itself, e.g., brand, model, make, manufacturer, source identification, encryption type, identified language or dialect, etc. Moreover, different characteristics can be captured for any given modality, for an example image, color saturation, facial recognition, fingerprint, iris pattern, skyline pattern, logo(s), weather, etc., for an example audio input, volume, frequency, spoken language/dialect, sound pressure, the sound of a people in the background, the sound of a traffic in the background, etc. It will be noted that numerous other examples can be readily raised though they cannot all be explicitly stated herein for the sake of brevity and clarity.

At 740, method 700 can comprise determining MECCI based on MEC data from 730. A characteristic of an event input received via a modality and can be determined from MEC data and be employed in an analysis of the significance of the characteristic in relation to other characteristics from other event inputs received by other modalities that are contemporaneous with the event. These can be analyzed against other event inputs from an event input source. These characteristics can be associated with the one or more input devices associated with an event input source, e.g., a UE, smartphone, tablet, wearable device, vehicle, keyboard, touchscreen, microphone, internet of things (IOT) enabled device, etc., associated with an event input source. The analysis can then determine a level of congruence between the modality-event characteristics. The determined level of MEC congruence, e.g., comprised in MECCI, can be employed to initiate a response.

At 750, method 700 can comprise enabling access to MECCI, e.g., MECCI can be made available for access by other devices, systems, methods, etc. In an aspect, MECCI can be made available to one or more UEs associated with receiving event information, e.g., the first UE at 710, the second UE at 720, etc., to enable a UE to respond to an input event based on the levels of congruence determined, e.g., different combinations of event inputs via different modalities, and MECs related thereto, can have different levels of congruence for each combination. By selecting a relevant combination of MECs, the associated determined level of congruence can be employed in determining a corresponding response.

At 760, method 700 can include, in response to the MECCI being determined to satisfy a rule related to a profile condition, initiating a response condition. At this point, method 700 can end. Rules and profiles can also be employed in conjunction with the analysis of the modality-event characteristics. A rule can impart broadly applicable conventions to determining a level of congruence. As an example, a rule can relate to determining similarity between waveforms, applying threshold values, defining normal rates of change in MEC values, etc. Profiles, in comparison to rules, can be employed to personalize congruence determinations. A profile value can be comprised in one or more profiles. A profile value, for example, can indicate weighting of modalities whereby some modalities can have a greater impact on MECCI than other modalities, can indicate modalities that are to be ignored, modalities that are to always be used, etc., can designate different rankings of modalities for different UEs, etc. Moreover, profiles can comprise characteristics that can be associated with individual true users, for example, images of the user, images of family members, the sound/voices of a true user's office, user schedules, input device types/models/brands/identities, etc. As such, where a plurality of modality-event characteristics are checked, there can be individualization of the congruence determination based on the user profile, as well as application of updateable general rules, that can be applied to the congruence determination.

FIG. 8 illustrates a method 800 that facilitates determining a congruence of event characteristics captured for an event via different modalities based on remotely stored rules in accordance with aspects of the subject disclosure. At 810, method 800 can comprise receiving MEC data. MEC data can comprise data related to a MEC. As disclosed herein, a MEC can be a characteristic associated with an event and modality. As such, a MEC can be extracted via a given modality from nearly any information source contemporaneously associated with an event input source. Modalities can include video, images, audio, EM, motion, tilt, proximity, orientation, direction, pressure, temperature, capacitance, resistance, chemical composition, etc., or even information itself, e.g., brand, model, make, manufacturer, source identification, encryption type, identified language or dialect, etc. Moreover, different characteristics can be captured for any given modality, for an example image, color saturation, facial recognition, fingerprint, iris pattern, skyline pattern, logo(s), weather, etc., for an example audio input, volume, frequency, spoken language/dialect, sound pressure, the sound of a people in the background, the sound of a traffic in the background, etc. It will be noted that numerous other examples can be readily raised though they cannot all be explicitly stated herein for the sake of brevity and clarity. MEC data can be related to an event input source that can be proximate to a UE. A UE can receive an event input from an event input source, e.g., as an event input via an $N^{th}$ mode, e.g., 210-218, 310-319, 410-418, etc. An event input source can be detectable or observable by UE, wherein the detection and observation ca be by way of the event input via the $N^{th}$ mode.

At 820, Method 800 can comprise receiving a congruence rule from a data store. The data store can store congruence rules including the congruence rule received at 820. Rules and profiles can also be employed in conjunction with the analysis of the modality-event characteristics. A rule can impart broadly applicable conventions to determining a level of congruence. As an example, a rule can relate to determining similarity between waveforms, applying threshold values, defining normal rates of change in MEC values, etc. Profiles, in comparison to rules, can be employed to personalize congruence determinations. A profile value can be comprised in one or more profiles. A profile value, for example, can indicate weighting of modalities whereby some modalities can have a greater or lesser impact on MECCI than other modalities, can indicate modalities that are to be ignored, modalities that are to always be used, etc., can designate different rankings of modalities for different UEs, etc. Moreover, profiles can comprise characteristics that can be associated with individual true users, for example, images of the user, images of family members, the sound/voices of a true user's office, user schedules, input device types/models/brands/identities, etc. As such, where a plurality of modality-event characteristics are checked, there can be individualization of the congruence determination based on the user profile, as well as application of updateable general rules, that can be applied to the congruence determination.

Method 800, at 830, can comprise determining MECCI based on the MEC data, from 810, in response to determining that the MEC data satisfies the congruence rule from 820. As an example, where the congruence rule relates to determining a level of similarity between waveform data, where the MEC data satisfies this rule, e.g., waveforms of the MEC data are sufficiently similar (or dissimilar), then the MEC data can be employed in determining the MECCI. In an aspect, determining MECCI based on MEC data from 810 can include determine a characteristic of an event input received via a modality that can be extracted from MEC data and be employed in an analysis of the significance of the characteristic in relation to other characteristics from other event inputs received by other modalities that are contemporaneous with the event. These can be analyzed in relation to other event inputs that satisfy a rule, per 820, and can be analyzed against other event inputs from an event input source. These characteristics can be associated with the same input source, e.g., a UE, smartphone, tablet, wearable device, vehicle, keyboard, touchscreen, microphone, internet of things (IOT) enabled device, etc., contemporaneously observing an event input source. The analysis can then determine a level of congruence between the modality-event characteristics. The MEC congruence, e.g., MECCI, can be employed to initiate a response.

At 840, MECCI can be made available for access by other devices, systems, methods, etc. In an aspect, MECCI can be made available to a UE associated with receiving event information to enable the UE to respond to the input event based on the levels of congruence determined, e.g., different combinations of event inputs via different modalities, and MECs related thereto, can have different levels of congruence for each combination. By selecting a relevant combination of MECs, the associated determined level of congruence can be employed in determining a corresponding response.

At 850, method 800 can include, receiving profile information from the data store, wherein the data store stores a profile associated with a user identity and includes a profile comprising the profile information. At 860, in response to the MECCI being determined to satisfy a rule related to the profile information from 850, method 800 can comprise initiating a response condition. At this point, method 800 can end. As previously disclosed, a profile can also be employed in conjunction with the analysis of the modality-event characteristics. Profiles, in comparison to congruence rules, can be employed to personalize congruence determinations. A profile value can be comprised in one or more profiles. As such, where a plurality of modality-event characteristics are checked, there can be individualization of the congruence determination based on the user profile, as well as application of updateable general rules, that can be applied to the congruence determination.

Figure 9:
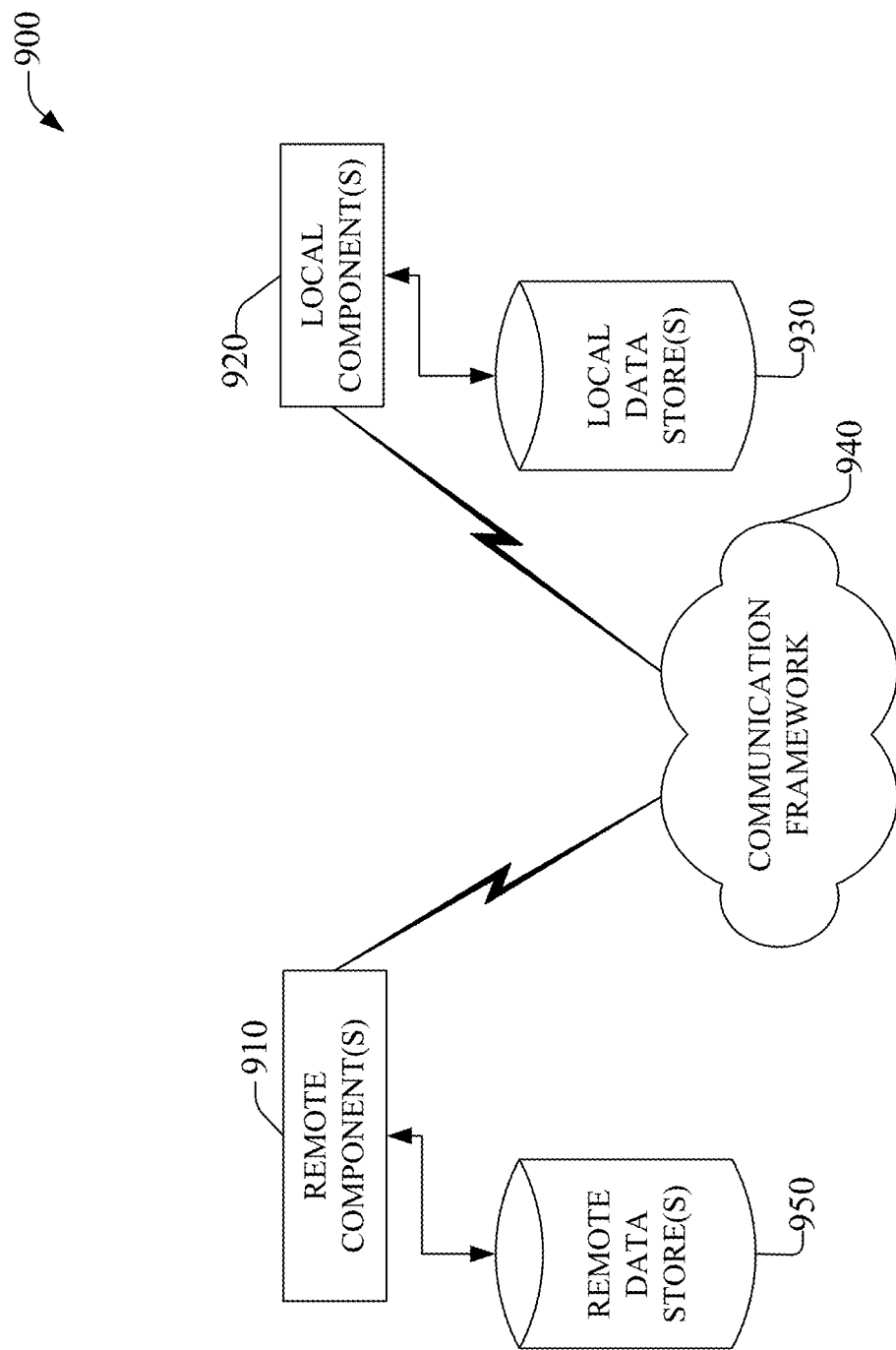
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can comprise servers, personal servers, wireless telecommunication network devices, etc. As an example, remote component(s) 910 can be UEs 240, 340, 342, etc., MECAC 422, etc., a remote server, etc.

The system 900 also comprises one or more local component(s) 920. The local component(s) 920 can be hardware and/or software (e.g., threads, processes, computing devices). In some embodiments, local component(s) 920 can comprise, for example, MECAC 220, 320, 420, etc., UE 440, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Figure 10:
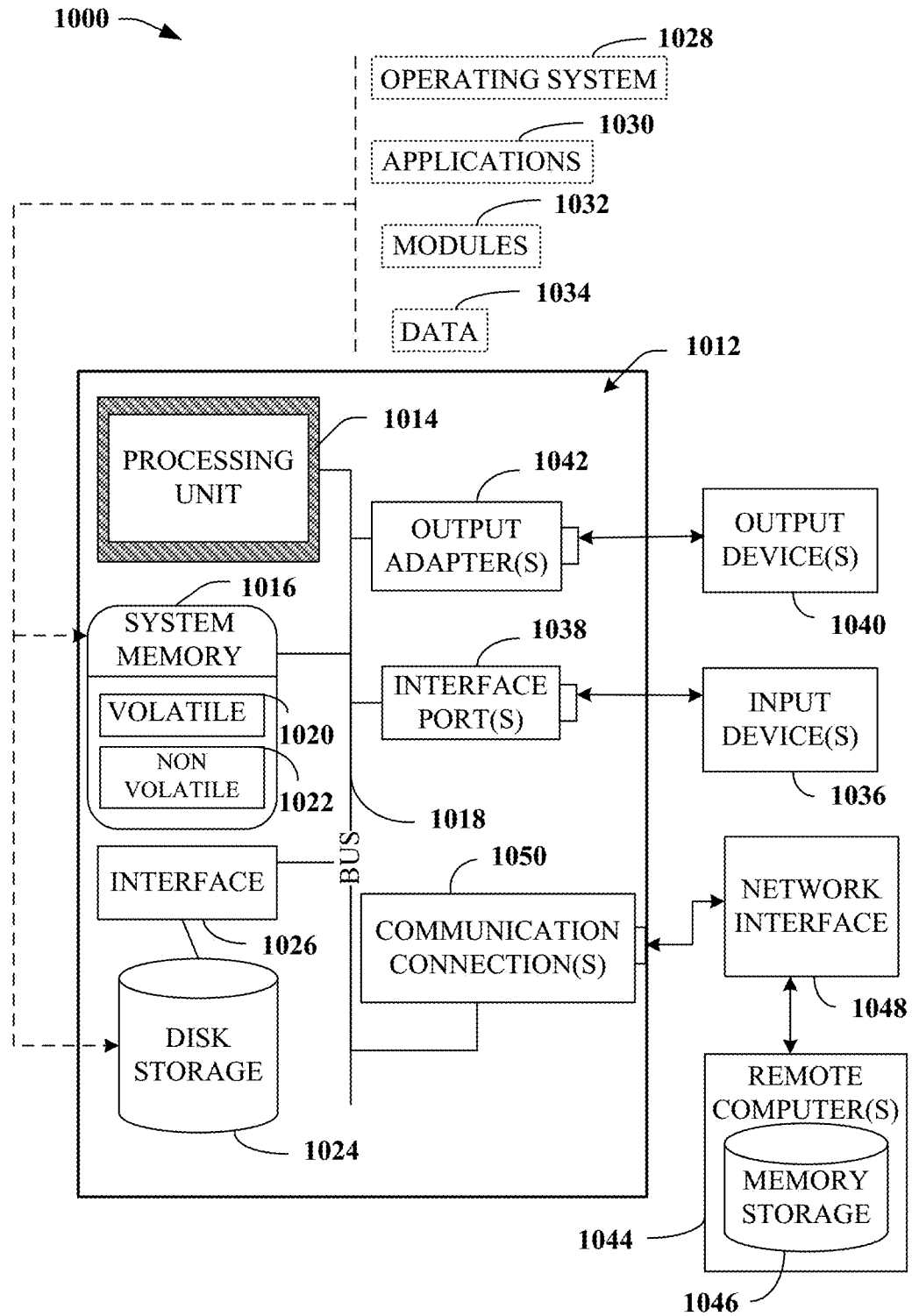
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, MECAC 120, 220, 320, 420, 422, 520, etc., UE 240, 340, 342, 440, etc., comprises a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synchlink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, cause a system comprising a processor to perform operations, comprising: receiving trigger information a remote device, e.g., a UE, and in response, generating communication augmentation information that can be accessed via an air interface or other wireless interface by one or more service interface components or other UEs to enable context sensitive communication augmentation.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse input GUI, a command line controlled interface, etc., allowing a user to interact with computer 1012. As an example, UE 240, 340, 342, 440, etc., can receive touch, motion, audio, visual, or other types of input. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor based appliance, a peer device, or other common network node and the like, and typically comprises many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can comprise packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; third generation partnership project, long term evolution; third generation partnership project universal mobile telecommunications system; third generation partnership project 2, ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A device, comprising:
   a processor; and
   a memory that stores executable instructions that, when executed by the processor, facilitate performance of operations, comprising:
      receiving an indication of a first characteristic of receiving data via an actual mode of input, wherein the data is communicated via an electrical signal, and wherein the first characteristic corresponds to an expected behavior of the electrical signal according to the actual mode of input;
      receiving an indication of a second characteristic of an assumed mode of input for the receiving the data, wherein the second characteristic corresponds to an expected behavior of the electrical signal according to the assumed mode of input; and
      in response to determining, based on the first characteristic and the second characteristic, that the assumed mode of input is a same mode of input as the actual mode of input, altering a use of the data.

2. The device of claim 1, wherein the first characteristic is determined from the data.

3. The device of claim 2, wherein the data is audio data, and wherein the first characteristic is an audio characteristic determined from the audio data.

4. The device of claim 1, wherein the first characteristic is determined from a sensor used to receive the data via the actual mode of input.

5. The device of claim 4, wherein the sensor is a touch sensor that detects a touch input, wherein the first characteristic is a touch input characteristic, and wherein the receiving of the data is via the touch sensor.

6. The device of claim 1, wherein the first characteristic is determined from a sensor that is not used to receive the data via the actual mode of input.

7. The device of claim 6, wherein the sensor is a motion sensor that receives motion input, wherein the first characteristic is a motion characteristic, and wherein the receiving the data is not via the motion sensor.

8. The device of claim 7, wherein the motion characteristic is a jiggle characteristic associated with a typing input, and wherein the receiving of the data is via a touch sensor enabling keying in the typing input.

9. The device of claim 1, wherein the determining of the assumed mode of input is the same mode of input as the actual mode of input comprises determining a level of congruence between a first group of characteristics comprising the first characteristic and a second group of supplementary characteristics comprising the second characteristic.

10. The device of claim 9, wherein the first group of characteristics further comprises a third characteristic of the receiving the data via the actual mode of input.

11. The device of claim 9, wherein the second group of supplementary characteristics further comprises a third characteristic of the assumed mode of input for the receiving the data via the actual mode of input.

12. The device of claim 1, wherein the altering of the use of the data comprises allowing use of the data.

13. The device of claim 1, wherein the device receives the data.

14. The device of claim 1, wherein the device does not receive the data.

15. A method, comprising:
   determining, by a system comprising a processor, a first characteristic of an environment of a device receiving data, wherein the first characteristic results from the device receiving the data via an input modality, and wherein the first characteristic is received from a first sensor of the environment;
   determining, by the system, a second characteristic of the environment of the device receiving the data, wherein the second characteristic results from the device receiving the data via the input modality, and wherein the second characteristic is received from a second sensor of the environment;
   in response to determining a validity of the input modality as a true input modality, altering, by the system, a use of the data, wherein the determining of the validity is based on a level of congruence between the first characteristic, the second characteristic, and historical characteristic data.

16. The method of claim 15, wherein the determining of the first characteristic of the environment of the device receiving the data comprises receiving a sensor measurement from a sensor employed to receive the data via the input modality.

17. The method of claim 15, wherein the determining of the second characteristic of the environment of the device receiving the data comprises receiving a sensor measurement from a sensor employed to receive input other than the data.

18. A non-transitory machine-readable medium, comprising executable instructions that, when executed by a processor, facilitate performance of operations, comprising:
   determining characteristics of an environment of a device receiving data, wherein the characteristics result from the device receiving the data via a mode of input, and wherein the characteristics are received from sensors of the environment;

determining a level of validity of the mode of input based on a level of congruence between the characteristics and historical characteristics; and altering a use of the data based on the level of validity of the mode of input.

19. The non-transitory machine-readable medium of claim 18, wherein the characteristics comprise a characteristic based on a sensor measurement from a sensor employed to receive the data.

20. The non-transitory machine-readable medium of claim 18, wherein the characteristics comprise a characteristic based on a sensor measurement from a sensor that does not receive the data.

* * * * *